United States Patent [19]

Akiyama

[11] Patent Number: 4,497,555
[45] Date of Patent: Feb. 5, 1985

[54] MOTOR-DRIVEN FILM WINDING MECHANISM

[75] Inventor: Kazuhiro Akiyama, Saitama, Japan

[73] Assignee: Fuji Photo Optical Co., Ltd., Saitama, Japan

[21] Appl. No.: 444,702

[22] Filed: Nov. 26, 1982

[30] Foreign Application Priority Data

Nov. 26, 1981 [JP] Japan .................... 56-189822

[51] Int. Cl.³ .................... G03B 1/12; G03B 1/24
[52] U.S. Cl. .................... 354/173.1; 354/212
[58] Field of Search ........... 354/173.1, 173.11, 212, 354/213, 214, 204-206

[56] References Cited
U.S. PATENT DOCUMENTS 4,145,011  3/1979  Date .................... 354/173.1 X Primary Examiner—John Gonzales
Attorney, Agent, or Firm—Young & Thompson

[57] ABSTRACT

A motor-driven film winding mechanism for cameras has a driving force transmission including a clutch releasably connecting a sprocket drum to the driving force transmission. The clutch can operate to release the sprocket drum from the system in dependence on the speed of movement of the sprocket drum relative to that of the transmission so as to cause the sprocket drum to be driven by the film either when wound up or rewound. The transmission is a gear train one of whose gears drives ratchets that engage with a ratchet wheel on the sprocket drum to constitute the one-way clutch.

5 Claims, 4 Drawing Figures

MOTOR-DRIVEN FILM WINDING MECHANISM

BACKGROUND OF THE INVENTION

The present invention relates to a motor-driven film winding mechanism, and, more particularly, to a motor-driven film winding mechanism having an improved driving force transmission system for a sprocket drum.

It is well known in the art to provide a motor-driven winding mechanism for a photographic camera either in the form of an attachment or in the form of a built-in mechanism. Such a motor-driven film winding mechanism is adapted to drive a take-up spool, a sprocket drum and a rewinding shaft by a driving motor through driving force transmission systems such as speed reduction gear trains, belt drives and the like.

There has recently been developed a motor-driven film winding mechanism for a camera which can function as an automatic film rewinding apparatus adapted automatically to start the rewinding operation immediately after the completion of exposures and automatically to stop when the film is fully rewound. When rewinding the film with such a motor-driven film winding mechanism, it is necessary to cause the driving motor to rotate in the reverse direction by, for instance, switching the current flow direction to the driving motor or to reverse the motion of the driving force transmission system by, for instance, adding or removing a reversing gear. From the viewpoint of simple construction and low cost, it may be said that the former is quite useful for motor-driven film winding mechanisms in comparison to the latter. Furthermore, the provision of a reversing gear makes the motor-driven film winding mechanism and hence the camera structure complicated and gives rise to great difficulties since a working mechanism for reversing the motion of the driving force transmission system which is mechanically responsive to the completion of exposures has to be additionally provided. Taking such difficulties into consideration, it is advantageous for the motor-driven winding mechanism to cause the driving motor to rotate in the reverse direction in order automatically to rewind the film because this does not require a reversing gear and the working mechanism associated therewith.

Another problem of conventional motor-driven winding mechanisms is that perforations of the film are damaged by excessive forces applied by the sprockets. In general, the sprocket drum of a film winding mechanism, whether it is motor driven or manually operated, is adapted to turn only one complete revolution in order to advance the film by the length of one frame. Now the take-up spool is adapted to attempt to wind up the film a little more than the length by which the sprockets feed the film in consideration of either the leading end of film being loosely grasped on the take-up spool or, in the case of an easy loading arrangement, there being no grasping of the leading end by the take-up spool at the beginning when the film is being moved into the take-up chamber. As winding proceeds, the diameter of the take-up spool increases, yet the film is wound by the same distance each time. In other words, the take-up spool attempts to drive the film a little too fast at the beginning when the diameter is small, and much too fast at the end when it is bulky with film. But as the sprockets drive the film through only a predetermined distance, the take-up spool is usually adapted to slip.

When using an electric motor as a driving source for such a film winding mechanism as is described above, both the take-up spool and the sprockets or sprocket drum have to be forced to rotate by the driving motor in order to wind up the film. Such a film winding mechanism, with the sprocket drum driven by a driving motor, often causes a problem during winding up when the sprockets attempt to drive the film farther even after the completion of exposures. The problem is that, when further winding up the film after the completion of exposures, the advance of the film is arrested because the film trailing end is fixed to the spool of the casette, while the sprockets attempt to rotate since the driving motor is maintained energized in the absence of a signal which is generated each time the film is wound by the length of one frame. If the parts remain in this state, the driving motor has too much load thereon and will burn out, unless before the burning out of the driving motor the film perforations are damaged by the sprockets. As a result of the latter, the sprockets are permitted to rotate further. On the other hand, the condition that the film has been fully exposed cannot be detected.

Moreover, the film at its margin provided with perforations is torn to shreds with which the velvet-protected opening of the cassette may become clogged, and thus a trouble-free rewinding is prevented even if rewinding takes place.

In order to avoid such problems, a conventional motor-driven film rewinding mechanism is provided with a tension-detecting means which causes the driving motor to be disenergized depending on the tension in the film at the time when the film is suddenly restrained. Despite the provision of tension-detecting means, damage to the perforations is unavoidable since the sudden stopping of the film causes the sprockets to crush the edges of the perforations. Therefore it is generally stated that the provision of tension-detecting means cannot fully solve the problem.

Since the motor-driven film winding mechanism described above is so constructed that the sprocket drum and hence the sprockets are driven in the reverse direction at a fixed speed during the rewinding operation, the rewinding shaft has to be slippable according to the increasing diameter of the rewinding spool owing to the fact that a constant amount of the film is driven by the sprockets.

As described above, in motor-driven film winding mechanism, especially having a switching device for causing the driving motor to rotate in the reverse direction for rewinding the film without the provision of a mechanical changeover device, the sprockets tend to damage the film perforations when they attempt to drive the film farther after the completion of exposures, because the sprockets in engagement with the perforations are forced to rotate by the driving motor. In addition, the motor-driven film winding mechanism unavoidably requires the provision of slipping mechanism everywhere desired in order that the same amount of film is driven by either the sprockets and the take-up spool or the sprockets and the rewinding spool. The provision of slipping mechanism is, however, inexpedient from the viewpoint of a complicated structure, as it adds greatly to the expense, has a low driving performance, and has a high electricity consumption.

SUMMARY OF THE INVENTION

It is therefore an object of the present invention to avoid the many drawbacks of prior art film winding mechanisms and to provide a motor-driven film winding arrangement for a photographic camera which is improved from the viewpoint both of preventing damage to the film perforations and of achieving a high driving performance.

It is another object of the present invention to provide a motor-driven winding mechanism for a photographic camera which requires no provision of a slipping mechanism for either the take-up spool or the rewinding shaft.

One feature of the present invention resides in that a motor-driven film winding mechanism has in its driving force transmission gear train, a clutch device releasably connecting a sprocket drum to the driving force transmission gear train, said clutch device being operable to release the sprocket drum from the gear train in dependence on the speed of the sprocket drum relative to the train so as to cause the sprocket drum to be driven by the film either wound-up or rewound.

Other objects and features of the present invention will become apparent from the following detailed description of preferred embodiments of the invention, taken in conjunction with the accompanying drawings.

BRIEF DESCRIPTION OF THE DRAWINGS

In the drawings.

It should be noted that in the drawings, like parts and members are designated by like numerals and symbols.

DESCRIPTION OF THE PREFERRED EMBODIMENTS

Figure 1:
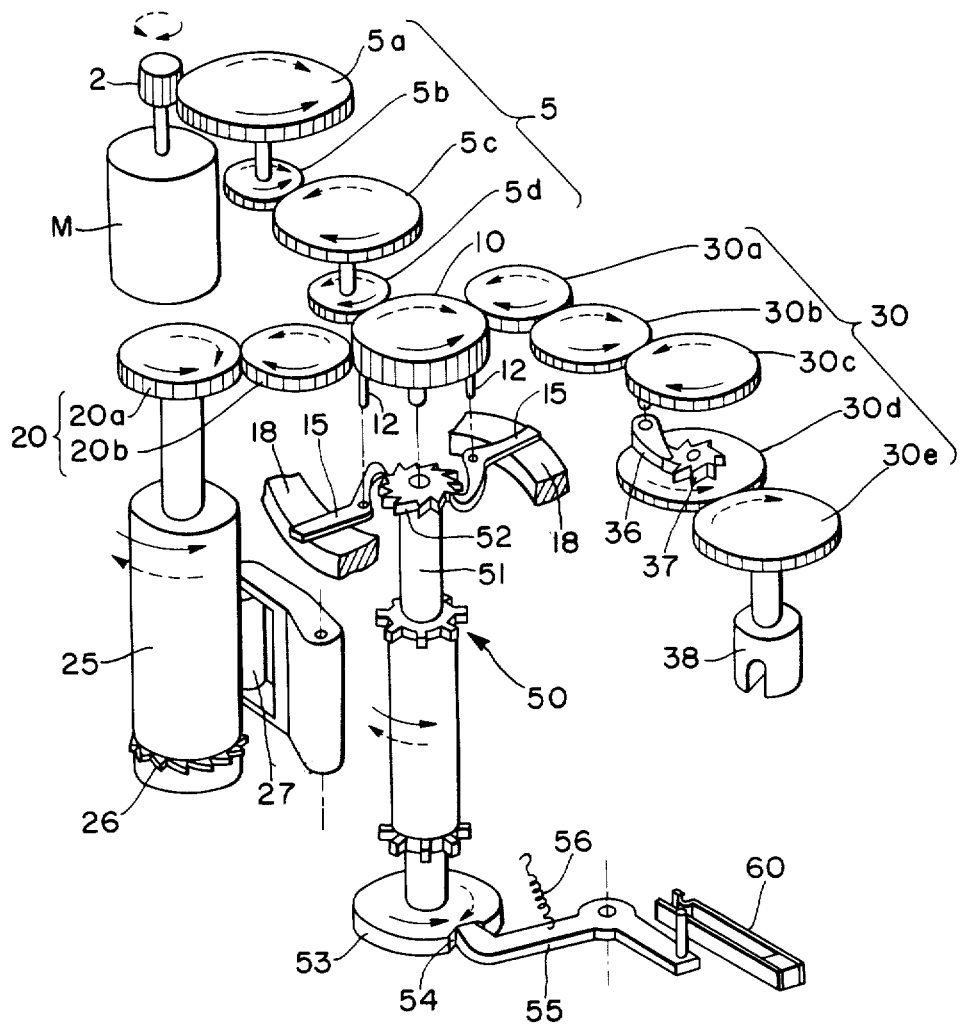
FIG. 1 is an exploded perspective view of the motor-driven film transfer mechanism built into a camera according to a preferred embodiment of the present invention.

The present invention will be explained with reference to the attached drawings, which show preferred embodiments of the present invention. The film winding mechanism of the present invention built into a camera, as shown in FIG. 1, includes an electric driving motor M having an output gear 2 in mesh with the first gear wheel 5a of a driving force transmission gear train 5. An idle gear wheel 10 is in mesh with the last or the fourth gear wheel 5d of the driving force transmission gear train 5 to rotate at a reduced speed and is also in mesh with both the gear wheel 20b of driving force transmission gear train 20 connected to a take-up spool 25 and the first gear wheel 30a of a driving force transmission gear train 30 connected to rewinding shaft 38.

On the gear wheel 30c of the rewinding gear trains 30 a clutch pawl 36 is swingably supported on a pivot pin and is biased by a spring (not shown) so as to come into engagement with the teeth of a ratchet wheel 37 which is coaxial with and rotatable dependently of the fourth gear 30d. The clutch pawl 36 and the clutch wheel 37 are operatively associated with each other to serve as a one-way clutch which, as is well-known, disconnects from the rewinding gear train 30 the film rewinding shaft 38 during the film winding operation.

The take-up spool 25 around which the film is wrapped is adapted to be rotated through the driving force transmission gear trains 5 and 20 including the idle gear wheel 10, at all times when the driving motor M rotates either in the direction shown by the solid line arrow or in the reverse direction shown by the dotted line arrow. The motor-driven winding mechanism shown as a preferred embodiment of the present invention in FIG. 1 includes, as a part thereof, a suitable easy-loading mechanism comprising a ratchet 26 secured to and coaxial with the take-up spool 25 at its base and a pressure roller 27 supported by a carrier member turnable on a pivot pin (not shown) which is mounted in the camera housing. The teeth of the ratchet wheel 26 are engageable with perforations of the film leader so as to wind up the film. The carrier member is biased to urge the pressure roller 27 against the take-up spool 25 with its rubber-coated surface, so that the film leader in frictional contact with the take-up spool is pulled in to be grasped therebetween, said film leader having been previously advanced by sprockets as described later into a take-up chamber of the camera housing. When grasping the film leader, the teeth of the ratchet wheel come into engagement with the film perforations to wind the film, thereby to form a succession of tightly wound convolutions.

A sprocket drum 50 has a plurality of sprockets at both ends which are, as is well-known, engageable in perforations of the film, and it is assumed in the case of using a 35 mm film that the sprocket can turn only one complete revolution to drive the film by the interval of one frame. Fixedly mounted on the top of a sprocket shaft 51 integral with the sprocket drum 50 is a ratchet wheel 52 which is engageable with a pair of pawls of ratchet arms 15 turnably supported on pivot pins 12 mounted on the idle gear wheel 100. The ratchet wheel 52 and ratchet arms 15 in combination form a clutch device for releasably connecting to the idle gear wheel 10 the sprocket drum 50 in operation, as fully described hereinafter.

Shown at 18 is a stationary circular flange on the camera housing, on the surface of which the ratchet arms 15 can slidably move thereby to be subjected to frictional resistance.

At the base of the sprocket shaft 51 is a control disc 53 having a notch 54 in its periphery into which a projection formed at one end of a switch control lever 55 is adapted to fall. The switch control lever 55 at its other end has a pin by which a switch 60 for energizing the driving motor M is pressed closed. The switch control lever 55 is turnably supported on a pivot pin (not shown) mounted in the camera housing and is further biased by a tension spring 56 to turn counterclockwise so that the projection is continually in contact with the periphery of the control disc 53.

Figure 2A:
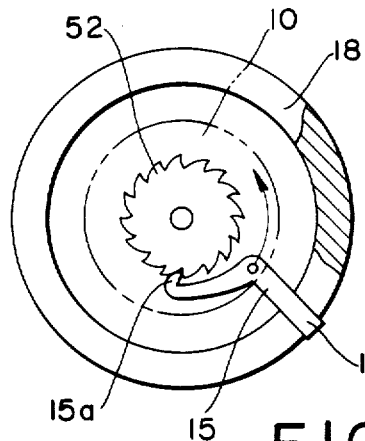
FIG. 2A is a fragmentary top view illustrating a clutch means in operative position.
Figure 2B:
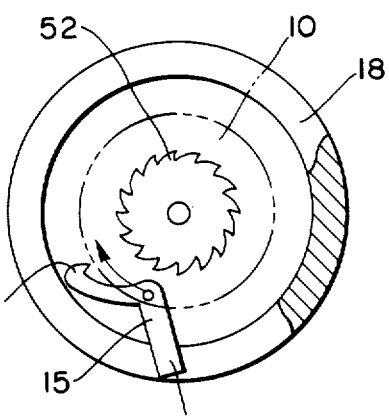
FIG. 2B is a fragmentary to view illustrating the clutch means in released position in which the motion of the driving motor is not transmitted to the sprocket shaft.

The operation of the clutch comprising the ratchet wheel 52 at top of the sprocket shaft 51, the ratchet arms 15 associated with the idle gear wheel 10 and the circular flange 18 stationarily provided on the camera housing will be understood from the following description with reference to FIGS. 2A and 2B. In FIG. 2A, rotation of the idle gear wheel 10 in the counterclockwise direction causes the ratchet 15 to turn therewith in the same direction. As a result of this, the end of the ratchet arm 15b is frictionally braked by the stationary flange 18 thereby to rotate arm 15 clockwise about the pivot pin 12 so that pawl 15a is brought into engagement with the teeth of the ratchet wheel 52, whereby the motion of rotation of idle gear wheel 10 is transmitted to the sprocket shaft 51 and hence to the sprocket drum 50 in the ratio 1:1.

When the ratchet wheel 52 rotates too fast, the pawl 15a will be forced to slide along the sloping sides of the teeth of the ratchet wheel 52, that is, the sprocket shaft 51 is operationally disconnected from the idle gear wheel 10. Consequently, the sprocket shaft 51 is no longer affected by the idle gear wheel 10. On the other hand, when the idle gear wheel followed by the ratchet arm 15 rotates in the reverse direction as shown in FIG. 2B, the ratchet arm 15 is caused to turn to some extent counterclockwise about the pivot pin 12 because the arm end 15b is frictionally braked by the stationary flange 18, thereby to disengage the pawl 15a from the teeth. Thus, the rotation of the idle gear wheel 10 in the reverse direction keeps the pawl 15a disengaged from the teeth of the ratchet wheel 52 so long as the idle gear wheel 10 continues to rotate. That is, the sprocket shaft 51 is operationally disconnected from the idle gear wheel 10, so that the sprocket drum 50 is no longer affected by the idle gear wheel 10.

As is apparent from the description above, the clutch operates to disconnect the sprocket shaft 51 and hence the sprocket drum 50 from the idle gear wheel 10 when the rotational speed of the sprocket drum 50 relative to the idle gear wheel 10 is positive. Here it is assumed that the counterclockwise sense is taken as the normal (positive) sense.

During the operation of the embodiment of the film winding mechanism shown in FIG. 1 and described above, when the film is wound up by the length of one frame after exposure, the switch control lever 55 is forced to turn counterclockwise by a member actuated by a shutter mechanism (not shown) at the time when the shutter is completely closed, as is well known, so that the projection of the switch control lever 55 leaves notch 54 of the control disc 53 while the pin on the switch control lever 55 at the opposite end forces the switch 60 to turn on, causing the driving motor M to be energized and then to rotate in the normal direction of the solid line arrow. The rotation of the driving motor M is transmitted through the gear train 5 to rotate the idle gear wheel 10 at a reduced and fixed speed. It is further transmitted through the gear train 20 to rotate the take-up spool counterclockwise, in which direction the take-up spool can wind up the film. Meanwhile, the sprocket drum 50 is also rotated in the same direction through the clutch which is in the condition shown in FIG. 2A, driving the film forwardly.

At the same time, the shutter mechanism is cocked, moving the aforementioned member actuated by the shutter mechanism, away from the switch control lever 55. This permits the switch control lever 55 to swing clockwise under the influence of spring 56; and its projection comes into contact with the peripheral surface of the control disc 53 and is kept in that position during the rotation of the control disc 53 owing to the fact that it is continuously biased clockwise by the spring 56. It should be noted that a slight rotation of the control disc takes place before the switch control lever 55 is released from the action of the aforementioned member actuated by the shutter mechanism.

After a complete revolution of the sprocket drum 50, the projection of the switch control lever 55 falls into the notch 54 of the control disc 53 thereby to permit layer 55 to turn clockwise a distance sufficient to open the switch 60 to turn the same off. Thus the driving motor M is deenergized and stops. In this way, the winding mechanism completes winding the film by one frame and only one frame, immediately after each exposure.

As the winding mechanism continues to wind up the film frame by frame, the diameter of the take-up spool 25 increases, and hence the take-up spool 25 attempts to drive the film too fast: a little too fast at the beginning when the diameter is small, and much too fast at the end when it is bulky with film. Consequently, the sprocket drum 50 is forced, by the film driven by the take-up spool, to rotate increasingly too fast, although the idle gear 10 continues to rotate at a fixed speed. When the relative speed of the sprocket drum 50 to the idle gear 10 becomes positive, the clutch is released, thereby operationally to disconnect the sprocket drum 50 from the idle gear 10, which then no longer transmits any driving force. By virtue of the provision of a clutch as described above, it is unnecessary to provide the take-up spool 25 with a slipping mechanism as is indispensable in conventional mechanisms. Also, the take-up spool 25 can be driven without any power loss.

Further winding up of the film after it is completely exposed is prevented because the film trailer end is fixed to the spool of a cassette. Although there is the problem in conventional winding mechanisms that this restriction causes the film perforations to be torn by the sprockets, the winding arrangement of the present invention wherein the film is forced to advance only by the take-up spool, which in turn drives the sprocket drum, completely avoids tearing the film perforations. This is an important advantage of this invention which is achieved by virtue of the provision of the clutch.

The clutch is applicable to an easy loading mechanism with a gear effect. When the amount by which the take-up spool 25 attempts to wind the film is larger than the sprocket-controlled amount, the film is, at the beginning when the film leader is forwarded into the take-up chamber, driven constantly by the sprockets of the sprocket drum 50 until the film leader is tightly wound by and around the take-up spool 25 in cooperation with the idle roller 27 supported by the carrier member turnable on the pivot pin and the ratchet wheel 26 at the base of the take-up spool 25. After the film leader has been tightly wound around the take-up spool 25, it is then pulled and hence wound by the take-up spool 25, while the sprockets engaged with the film perforations are driven by the continuously driven film, thus advancing the film by the length of one frame. During the easy loading and film winding operation, the driving motor M rotates in the direction of the solid line arrow. At this time, the rewinding shaft 38 does not rotate because the one-way clutch 36–37 is released.

The film rewinding operation in the film winding arrangement shown in FIG. 1 is performed as follows. The driving motor M is at first caused to rotate in the reverse direction shown by dotted line arrow, by means of an electric control circuit (not shown). The driving motor M rotating in the reverse direction causes the rewinding gear train 30 of gear wheels 30a to 30e and hence the rewinding shaft 38 to rotate in the direction of the dotted line arrows. Although the idle gear wheel 10 is rotated by the driving motor M through the driving force transmission gear train 5, the sprocket drum 50 and hence the sprockets do not rotate due to the fact that the clutch comprising ratchet arms 15 and the ratchet wheel 52 is released, as shown in FIG. 2B. It should be noted in this operation that the take-up spool 25 has to drive the film at a speed a little faster than the rewinding speed at which the film is pulled by the rewinding spool connected to the rewinding shaft 38. This produces the desirable result that the film becomes loose in the take-up chamber and so does not put too much load on the rewinding shaft 35. Furthermore, the loosened film causes itself to disengage from the teeth of the ratchet wheel 26 at the base of the take-up spool 25.

As rewinding of the film proceeds, the diameter of the rewinding spool increases, so that the length of the film rewound per revolution gradually increases. Since, however, the clutch 15 and 52 has been released as shown in FIG. 2B, the sprockets are driven only by the film through the film perforations. It should be noted that the control disc 53 continues to rotate throughout the rewinding operation. For this reason, it is necessary to maintain the projection of the switch control lever 55 out of the notch 54 of the control disc 53 so as to keep the driving motor M energized. On the other hand, to provide the winding gear train 20 with the same clutch as described hereinbefore is desirable, so as to avoid the necessity of providing a slipping mechanism on the rewinding shaft.

Figure 3:
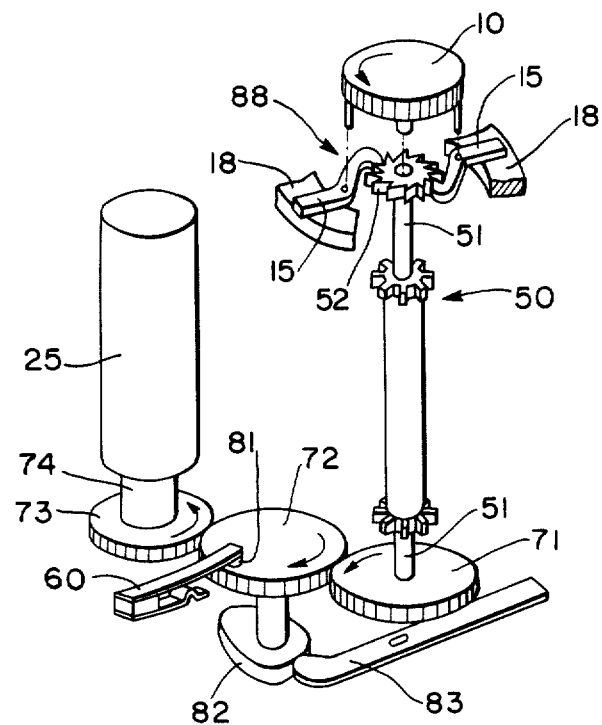
FIG. 3 is an exploded perspective view of the motor-driven film transfer mechanism built into a camera according to another preferred embodiment of the present invention wherein only the modified parts are shown, for the sake of clarity.

FIG. 3 shows a modified embodiment suitable for a film rewinding mechanism wherein the take-up spool 25 rotates in cooperation with the sprocket drum 50. A gear wheel 71 of the sprocket drum 50 is in mesh with a gear wheel 72 of the same diameter, with which latter a spool gear wheel 73 is in mesh so that the take-up spool can rotate as the sprocket drum rotates to drive the film. There is of course provided the same clutch 88 as described for the mechanism shown in FIG. 1. The essential requirement of this mechanism is a slipping mechanism 74 between the take-up spool 25 and the spool gear wheel 73. The gear wheel 72 is provided with both a switch-actuating projection 81 which maintains a switch 60 turn off in its stopped position shown in FIG. 3, and a shutter-charging cam 82 with the periphery of which a well-known shutter-charging lever 83 is in contact.

During a winding-up operation of the film rewinding mechanism of FIG. 3, when the idle gear 10 is rotated in the direction of the solid line arrow by a driving motor in the same way as in FIG. 1, the gear wheels are rotated in the directions of their respective arrows. This operation causing the film to be wound up is similar to that of conventional film winding mechanisms of the type having a sprocket drum which is forced to rotate. But since, on the other hand, the provision of the clutch 88 allows sprocket drum 50 to be driven by the film during a rewinding operation, the rewind spool or shaft is not required to slip to accommodate the increasing diameter of the rewinding spool.

It will be seen from the foregoing that, in the film winding mechanism according to the present invention, the clutch is released to disconnect the sprocket drum from the driving force transmission gear trains whenever the relative speed of the idle gear connected to the sprocket drum is positive, so that the sprockets never damage the film perforations at all during film-winding-up, film end detection and/or film rewinding. Also in the present invention, any slipping mechanism as required in the conventional devices need not be provided in the driving force transmission gear trains.

While specific embodiments of the invention have been shown and described in detail to illustrate the principles of the invention, it will be understood that the invention may be embodied otherwise without departing from such principles.

What is claimed is:

1. A motor-driven film winding mechanism for a photographic camera, comprising:

a driving motor;

a driving force transmission;

a take-up spool driven by said driving motor through said driving force transmission for winding up a film on the spool;

a sprocket drum having a plurality of sprockets on its periphery which are engageable with film perforations; and means for releasably connecting said sprocket drum to said driving force transmission in dependence on the speed of movement of said sprocket drum relative to the speed of movement of said driving force transmission, said releasably connecting means releasing from said driving force transmission said sprocket drum when the speed of movement of said sprocket drum is greater than that of said driving force transmission.

2. A motor-driven film winding arrangement as defined in claim 1, said driving force transmission being a gear train.

3. A motor-driven film winding arrangement as defined in claim 1, said sprocket drum when released from said driving force transmission being forced to rotate by the film, while restricting to one frame the length of the film to be driven.

4. A motor-driven film winding arrangement as defined in claim 1, said releasably connecting means also releasing from said driving force transmission said sprocket drum when said driving force transmission is driven in a direction to rewind the film.

5. A motor-driven film winding mechanism for a photographic camera, comprising:

a driving motor;

a driving force transmission gear train;

a take-up spool driven by said driving motor through said driving force transmission gear train for winding up a film on the spool;

a sprocket drum having a plurality of sprockets on its periphery which are engageable with film perforations; and means for releasably connecting said sprocket drum to said driving force transmission gear train in dependence on the speed of movement of said sprocket drum relative to the speed of movement of said driving force transmission gear train, said releasably connecting means being a clutch comprising a ratchet arm mounted for rotation on and with a gear of said driving force transmission gear train, and a ratchet wheel integral with said sprocket drum, said ratchet arm being engageable in one-way driving relation with said ratchet wheel.

* * * * *